(12) United States Patent
Baumann et al.

(10) Patent No.: US 7,441,829 B2
(45) Date of Patent: Oct. 28, 2008

(54) SUPPORTING STRUCTURE FOR A MOTOR VEHICLE

(75) Inventors: Karl-Heinz Baumann, Bondorf (DE); Uwe Krempels, Boeblingen (DE); Jochen Ruf, Pforzheim (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/545,663

(22) PCT Filed: Dec. 20, 2003

(86) PCT No.: PCT/EP03/14682

§ 371 (c)(1), (2), (4) Date: Jun. 27, 2006

(87) PCT Pub. No.: WO2004/071851

PCT Pub. Date: Aug. 26, 2004

(65) Prior Publication Data

US 2006/0244287 A1 Nov. 2, 2006

(30) Foreign Application Priority Data

Feb. 13, 2003 (DE) ................................. 103 05 910

(51) Int. Cl.
*B62D 25/20* (2006.01)

(52) U.S. Cl. .............................. 296/187.09; 296/187.03

(58) Field of Classification Search .................. 293/132, 293/135, 137; 296/187.03, 187.09

See application file for complete search history.

(56) References Cited

U.S. PATENT DOCUMENTS

| 3,881,742 A | 5/1975 | Felzer |
| 5,348,113 A | 9/1994 | Drvota et al. |
| 6,027,159 A | 2/2000 | Baumann |

FOREIGN PATENT DOCUMENTS

JP 07267148 A * 10/1995

\* cited by examiner

*Primary Examiner*—H Gutman
*Assistant Examiner*—Melissa A Black
(74) *Attorney, Agent, or Firm*—Crowell & Moring LLP

(57) ABSTRACT

A supporting structure for a motor vehicle which, at a front end of a safety passenger cell, is provided with a front section with a crumple zone and two wheel housings which are arranged laterally in the region of the crumple zone and in which a respective wheel having a tire and a wheel rim, is arranged. A wheel support ramp which runs obliquely downward, as seen from the travel direction, is formed and causes the respective wheel, which has been moved toward the wheel support ramp as a consequence of a crash-induced deformation of the crumple zone, to be guided downward in the direction of the safety passenger cell. An additional wheel impact element is provided for each wheel and is deformable by the respective wheel (3) that has been moved as a consequence of the crash-induced deformation of the crumple zone.

4 Claims, 2 Drawing Sheets

SUPPORTING STRUCTURE FOR A MOTOR VEHICLE

BACKGROUND OF THE INVENTION

The present invention relates to a supporting structure for a motor vehicle, and more particularly, to a supporting structure for a motor vehicle, which, at a front end of a safety passenger cell, is provided with a front section with a crumple zone and two wheel housings which are arranged laterally in the region of comprising a tire and wheel rim, is arranged, a wheel support ramp which runs obliquely downward, as seen from the direction of travel, being formed and causing the respective wheel, which has been moved toward the wheel support ramp as a consquence of a crash-induced deformation of the crumple zone, to be guided downward in the direction of the safety passenger cell.

A supporting structure is disclosed, for example, in EP 1044863 A1, where a deflecting surface which runs obliquely downward, as seen from the direction of travel, is provided in each case for an associated wheel of a motor vehicle, the corresponding wheel is moved toward the deflecting surface as a consequence of a crash-induced deformation of the crumple zone of the motor vehicle supporting structure described there and, as a consequence of the further movement during deformation of the crumple zone, is guided along the deflecting surface in the direction of a safety passenger cell of the motor vehicle supporting structure in a manner such that it drops below a floor of this structure.

The effect intended to be achieved by the aforementioned motor vehicle supporting structure is that, even if the crumple zone is fully deformed, the deflecting function for the wheels means that the latter, as far as possible, do not deform the deflecting surface and the safety passenger cell, so as to be able to ensure that even after a crash the side doors of the safety passenger cell will be openable. However, a particular reduction of crash-induced deceleration forces on people in the interior of the safety passenger cell, in particular by the relatively stiff wheel rim body striking against the corresponding deflecting surface, is not envisaged there.

German utility model 9312073.7 describes a deformation zone which can be deformed destructively and is provided between a tire and a passenger cabin in order to provide a relatively rigid passenger cabin with, at the same time, improved absorption of impact energy. However, kinematic problems which arise with regard to the action of force on the vehicle occupants, for example, due to the crash-induced "dipping" of the front section of a vehicle, in particular also with regard to any possible injuries on account of contact with corresponding internal surfaces of the passenger cabin, are not addressed.

In general, during the sequence of deformation in the course of a head-on impact of a motor vehicle, and in view of the forces necessary for deforming the rims of the front wheels, a problem arises in that there is a sudden rise in the deceleration values or force values acting on the vehicle occupants in a relatively late impact phase after very substantial deformation of the crumple zone of the motor vehicle supporting structure has already taken place.

SUMMARY OF THE INVENTION

An object of the present invention is, therefore, to overcome the disadvantages of known motor vehicle supporting structures, in particular to provide a supporting structure for a motor vehicle, in which a sudden rise in the deceleration values and force values acting on the occupants in the impact phase is avoided.

Furthermore, another object of the present invention to prevent an unfavorable occupant kinematics, i.e., in particular, a striking especially of the head area of occupants against the inside of a safety passenger cell of a vehicle.

These and other objects have been achieved according to the invention by a supporting structure for a motor vehicle and an additional wheel impact elememt provided for each wheel and deformable by the respective wheel that has been moved because of the crash-induced deformation of the crumple zone, for additional energy absorbtion.

According to one embodiemt of the present invention, a supporting structure for a motor vehicle is provided, which, at a front end of a safety passenger cell, is provided with a front section with a crumple zone and two wheel housings which are arranged laterally in the region of the crumple zone and in which a respective wheel, including a pneumatic tire and a relatively stiff wheel rim, is arranged. The inventive supporting structure for a motor vehicle has a wheel support ramp which runs obliquely downward, as seen from the travel direction, and causes the respective wheel, which is moved toward the wheel support ramp as a consequence of a crash-induced deformation of the crumple zone, to be guided downward in the direction of the safety passenger cell.

According to another feature of the invention, an additional wheel impact element is provided for each wheel and can be deformed by the respective wheel, that has been moved as a consequence of the crash-induced deformation of the crumple zone, for the corresponding additional absorption of energy, in particular the energy which is required for deforming the relatively stiff wheel rim.

Due to the provision both of a wheel support ramp and of an additional wheel impact element, it is therefore new achievable, on the one hand, to provide a sufficiently stable and reliable guide for the wheel, to prevent the dipping of the front section and therefore the risk of occupants striking their head against the inside of the safety passenger cell in certain regions, e.g., the A-pillar of the passenger cell. On the other hand, also a sudden rise, which actually occurs because of the stable guide for the wheel, in the force level or deceleration values which act, on the occupants, in particular in the later impact phase after already substantial deformation of the crumple zone on account of the deformation in particular of the wheel rim, is avoided by the respective, additional wheel impact element. This interaction according to the present invention therefore additionally increases the safety for the vehicle occupants in a particular manner.

According to one preferred embodiment of the invention, the force or the deceleration which acts on the wheel support ramp due to the movement of the respective wheel as a consequence of the crash-induced deformation of the crumple zone can be coordinated via suitable construction parameters of the wheel support ramp and/or of the respective wheel impact element, with a force or a deceleration which acts on the respective wheel impact element due to the movement of the respective wheel as a consequence of the crash-induced deformation of the crumple zone.

This coordination of the wheel support ramp with the respective wheel impact element enables the interaction between the force or deceleration profile and the vehicle kinematics (inclination of the vehicle, dropping of the front section of the vehicle) to be controlled in a particularly simple manner via the corresponding construction parameters of the wheel support ramp and/or of the respective wheel impact element. As a result, a sudden rise in the force or deceleration values acting on the occupants, in particular in a later impact phase, can be particularly reliably avoided in a particularly reliable manner.

The present invention makes possible, in particular, for the deceleration and therefore the absorption of energy and the kinematics of the vehicle to be able to be influenced via the suitable construction parameters of the wheel support ramp and/or of the respective wheel impact element that are able to be coordinated. Thus, suitable selection of the respective construction parameters enables the vehicle to be directed in one particular direction during an impact, in which case, in particular, a dipping of the front section while the deformation zone is nevertheless available at the same time can be prevented by the wheel impact element.

According to one preferred embodiment of the invention, suitable construction parameters are the material properties of the wheel support ramp and/or of the respective wheel impact element, it being possible, as material properties, for, in particular, the strength and rigidity of the wheel support ramp and of the respective wheel impact element to be particularly important. The deformation distances of the wheel support ramp and/or of the respective wheel impact element can also be used on their own or in combination with the other construction parameters as suitable parameters for coordinating the wheel support ramp and/or respective wheel impact element.

Furthermore, a suitable construction parameter on its own or in combination with the construction parameters already mentioned is preferably also the geometry of the wheel support ramp and/or of the respective wheel impact element, with it being possible, with regard to the geometry of the wheel support ramp, for suitable geometry parameters to be, in particular, the angle α of the wheel support ramp running obliquely downward and/or the structurally predetermined distance of the wheel from the wheel impact element. It is particularly preferable for the wheel impact element, in the event of a crash, to be situated essentially level with the axle of the respective wheel in order thereby to ensure an as far as possible reliable additional absorption of energy by corresponding deformation of the respective wheel impact element.

Particularly simple to realize is a preferred design according to the invention of a motor vehicle supporting structure in which the respective wheel impact element is an extension of a respective sill of the safety passenger cell in the direction of the respective wheel. The correspondingly constructed respective wheel impact element can therefore be particularly simply and reliably deformed by the respective wheel in the event of a crash.

The essential construction elements of the supporting structure according to the invention, such as the safety passenger cell, the crumple zone, the wheel support ramp and the respective wheel impact element, can preferably be composed of suitable light metal materials or correspondingly suitable steel sheets, with it being possible, by suitable material selection, to structurally coordinate the required values of rigidity and deformability in each case.

BRIEF DESCRIPTION OF THE DRAWINGS

Other objects, advantages and novel features of the present invention will become apparent from the following detailed description of the invention when considered in conjuction with the accompanying drawings.

DETAILED DESCRIPTION OF THE INVENTION

Figure 1:
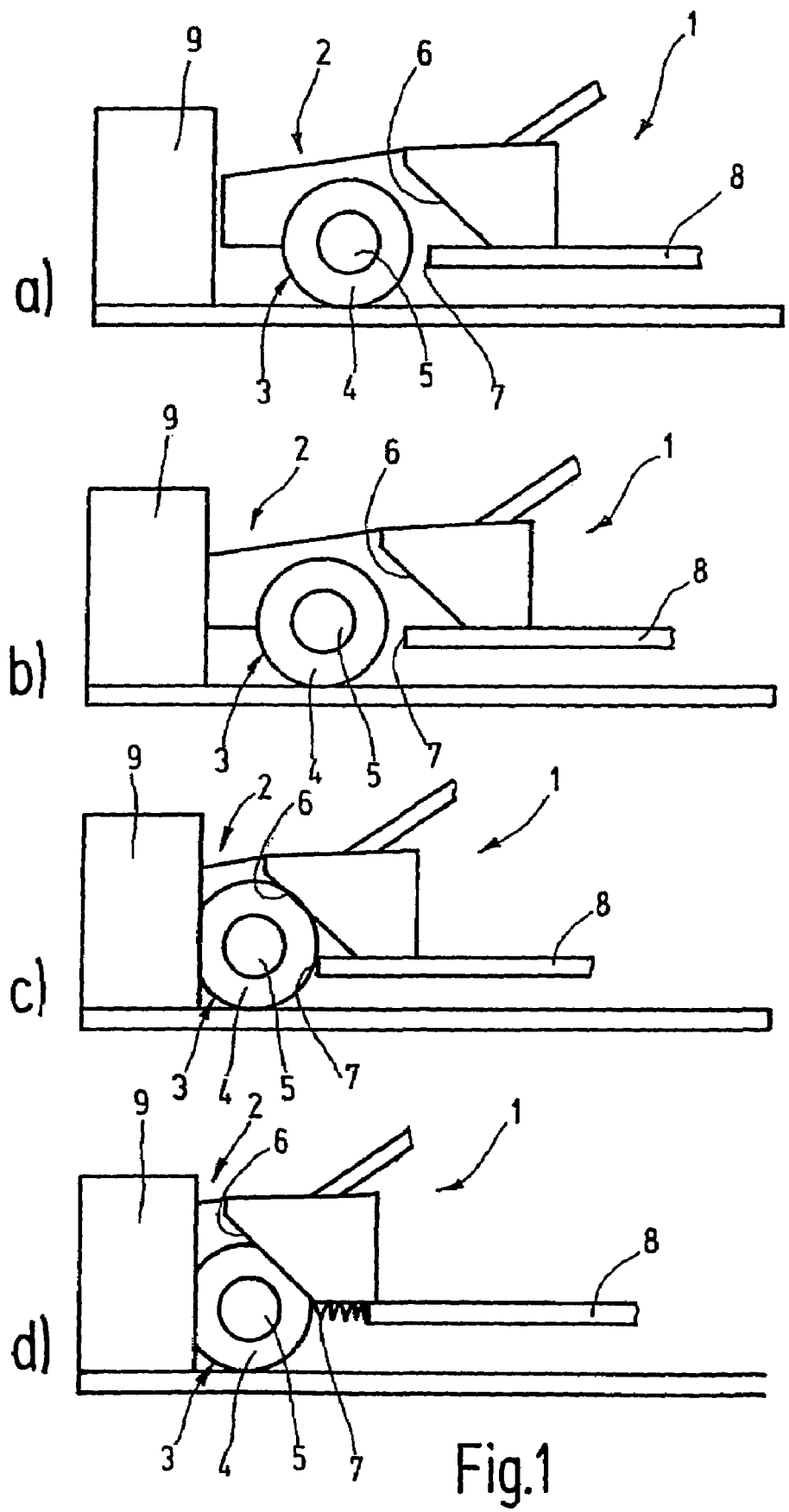
FIGS. 1a-d show four schematic side views of the front crumple zone and the rearwardly adjoining front region of the safety passenger cell of a supporting structure of a motor vehicle according to a presently preferred embodiment of the present invention, showing temporally consecutive stages of a head-on impact of a corresponding motor vehicle against an obstacle, and FIG. 2 schematically shows force and movement directions of individual structural elements of the supporting structure according to the preferred embodiment of FIG. 1.

FIG. 1 shows four schematic side views of the region of the front section of a motor vehicle with a supporting structure according to a currently preferred embodiment of the present invention. The same construction features are denoted by the same reference numbers in each of the four illustrations.

FIG. 1a shows a front part of a supporting structure of a motor vehicle before the impact against a fixed obstacle 9. The supporting structure is formed by a safety passenger cell 1 with a front section with a crumple zone 2 which is deformed in the event of an impact in order to absorb energy. The supporting structure is provided with two wheel housings which are arranged laterally in the region of the crumple zone and in which a respective wheel 3, comprising a tire 4, which is usually formed by a commercially available, tubular pneumatic tire, and a wheel rim 5, usually composed of stainless steel or aluminum, is arranged.

As seen from the front from the direction of travel, the supporting structure has, in the front region of the safety passenger cell 1, a wheel support ramp 6 which runs downward and causes the respective wheel 3, which has been moved toward the wheel support ramp 6 as a consequence of a crash-induced deformation of the crumple zone 2, to be guided downward in the direction of the safety passenger cell 1 into the region of the floor of the safety passenger cell 1. Furthermore, the supporting structure has an additional wheel impact element 7 which can be deformed by the respective wheel 3 that has been moved as a consequence of a crash-induced deformation of the crumple zone 2, for the corresponding additional absorption of energy, in particular for absorbing further deformation energy due to the wheel rim 5. In general, the structural elements of the supporting structure according to the invention can be formed by suitable steel or aluminum materials which are readily known in automobile engineering and therefore need not described here.

FIG. 1b shows the supporting structure according to the invention of a motor vehicle at the moment in which the corresponding motor vehicle strikes against the obstacle 9, with the crash-induced deformation of the front crumple zone 2 just beginning here. As already illustrated in FIG. 1a, the wheel impact element 7 is an extension of a sill 8 of the safety passenger cell 1 in the direction of the wheel 3.

FIG. 1c shows the further profile of the impact, with the crumple zone 2 now being very substantially deformed in order to absorb the energy of the crash-induced impact. A deformation of the wheel 3 is now taking place, the latter having already been pushed toward the wheel support ramp 6 and at the same time already in the direction of the additional corresponding wheel impact element 7. The pneumatic tire 4 has already been correspondingly deformed.

In the transition from the illustration of FIG. 1c to the illustration of FIG. 1d it is shown that the corresponding wheel 3 is guided downward along the oblique surface of the wheel support ramp 6 into the region of the floor of the supporting structure according to the invention. This takes place on account of the further crash-induced forward movement of the entire supporting structure of the motor vehicle. To absorb the energy which additionally occurs and arises in this further crash profile from the movement of the wheel 3, in particular of the relatively stiff wheel rim 5 of the wheel, a deformation of the additional wheel impact element 7 for the corresponding additional absorption of energy is illustrated in FIG. 1d by corresponding serrations. According to the present invention, at this late impact time, the additional wheel impact element 7 is preferably located approximately level with the axle of the wheel 3.

As is apparent from the schematic illustrations of FIG. 1, firstly, by corresponding interaction of the wheel support ramp 6 with the additional wheel impact element 7, the wheel 3, which is moving because of the crash, is reliably guided and, secondly, the additional wheel impact element 7 enables the energy which occurs and arises because of contact of the wheel 3 with the wheel support ramp 6 and the wheel impact element 7 to be largely absorbed by the wheel impact element 7, by corresponding deformation thereof, without obstructing the reliable guiding by means of the wheel support ramp 6. In particular, this design according to the invention of the supporting structure enables the energy arising from the corresponding movement and/or deformation of the wheel 3 at a later time of the impact to be particularly reliably absorbed by corresponding deformation of the wheel impact element 7.

Figure 2:
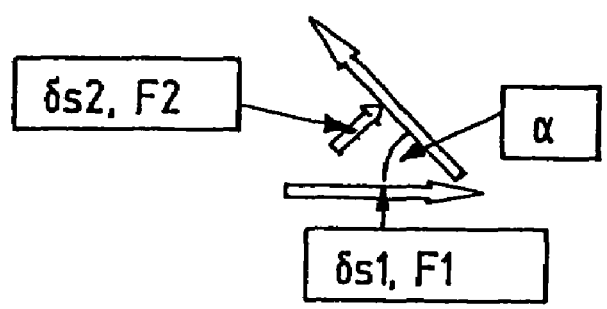

FIG. 2 schematically shows the movement and force directions which arise in the embodiment of the present invention shown in FIG. 1. The arrow in FIG. 2 which points from the right at the bottom to the left at the top and which assumes an angle α with respect to the horizontal reproduces the direction in which the wheel support ramp 6 runs structurally at an angle running obliquely downward (as seen from the direction of travel). The arrow which is directed obliquely upward in FIG. 2 indicates the relative movement of the wheel support ramp 6 with respect to the wheel 3 which can be correspondingly guided downward (as seen from the travel direction) by the wheel support ramp. The horizontal arrow in FIG. 2 indicates, firstly, the force level F1 and the corresponding force direction and the deformation distance δs1 of the additional wheel impact element 7, provided according to the invention, under the influence of the movement of the wheel 3 which is moving because of the crash. The arrow in FIG. 2 that is directed from the left at the bottom to the right at the top indicates the force level F2, the corresponding force direction and the deformation distance δs2 of the wheel 3 moving as a consequence of the crash. As can be seen from FIG. 2, owing to the movement of the wheel 3, most of the force occurring because of the crash is absorbed by the corresponding additional wheel impact element 7 (horizontal, long arrow in FIG. 2) while, on account of the corresponding interaction, only a small part of the force acts on the wheel support ramp 6 (arrow running obliquely upwards to the right δs2, F2 of FIG. 2) on account of the crash-induced movement of the wheel 3. The relative movement of the wheel 3 and of the wheel support ramp 6 is indicated in FIG. 2 by the arrow running at an angle α upward.

As can be seen from FIG. 2, a coordination of the force profiles F1, F2 and of the deformation distances δs1, δs2 can take place via corresponding construction parameters of the supporting structure according to the invention, in particular also via the flexibility of the wheel impact element 7 (force level F1, deformation distance δs1) and the position thereof in relation to the wheel (see FIG. 1d) and the flexibility, the position and the angle of inclination a of the wheel support ramp 6 in interaction with the crash-induced movement of the wheel 3 (force level F2, deformation distance δs2).

The foregoing disclosure has been set forth merely to illustrate the invention and is not intended to be limiting. Since modifications of the disclosed embodiemtns incorporating the spitit and substance of the invention may occur to persons skilled in the art, the invention should be construed to include everything within the scope of hte appended claims and equivalents thereof.

The invention claimed is:

1. A supporting structure for use at a front end of a safety passenger cell comprising a front section with a crumple zone and two wheel housings arranged laterally in a region of the crumple zone and in which a respective wheel, including a tire and a wheel rim, is arranged, a wheel support ramp running obliquely downwardly, as seen from a travel direction, and being configured to contact the respective wheel at a level so that the respective wheel, which has been moved toward the wheel support ramp by a crash-induced deformation of the crumple zone, is guided downwardly in a direction of the safety passenger cell, and a separate wheel impact element provided for each wheel and coordinated with a force which acts on the wheel support ramp so as to be deformable relative to the wheel support ramp by the respective wheel that has been moved because of the crash-induced deformation of the crumple zone, for additional energy absorption after deformation of the crumple zone has substantially occurred.

2. The supporting structure as claimed in claim 1, wherein the coordination between the force which acts on the wheel support ramp due to movement of the respective wheel because of the crash-induced deformation of the crumple zone is effected via selected construction parameters of at least one of the wheel support ramp and the respective wheel impact element with a force which acts on the respective wheel impact element due to the movement of the respective wheel because of the crash-induced deformation of the crumple zone.

3. The supporting structure as claimed in claim 2, wherein the construction parameters are at least one of material properties, including at least one of strength and stiffness of at least one the wheel support ramp and the respective wheel impact element, deformation distances of at least one of the wheel support ramp and of the respective wheel impact element, and of the geometry of the wheel support ramp, including at least one of an angle of the wheel support ramp extending obliquely downward and of the respective wheel impact element, including a structurally predetermined distance of the wheel from the wheel impact element.

4. The supporting structure as claimed in claim 1, wherein the respective wheel impact element is an extension of a respective sill of the safety passenger cell in a direction of the respective wheel.

* * * * *